(12) United States Patent
Yamaguchi et al.

(10) Patent No.: US 12,427,577 B2
(45) Date of Patent: Sep. 30, 2025

(54) LAMINATING-PRINTING SYSTEM AND LAMINATING-PRINTING METHOD

(71) Applicant: TAIYO NIPPON SANSO CORPORATION, Tokyo (JP)

(72) Inventors: Yusuke Yamaguchi, Tokyo (JP); Tomohiro Oyama, Tokyo (JP); Hiroki Amano, Tokyo (JP); Ryo Akamatsu, Tokyo (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 552 days.

(21) Appl. No.: 17/776,371

(22) PCT Filed: Nov. 13, 2020

(86) PCT No.: PCT/JP2020/042502
§ 371 (c)(1),
(2) Date: May 12, 2022

(87) PCT Pub. No.: WO2021/095871
PCT Pub. Date: May 20, 2021

(65) Prior Publication Data
US 2022/0395905 A1    Dec. 15, 2022

(30) Foreign Application Priority Data
Nov. 14, 2019   (JP) .................. 2019-205956

(51) Int. Cl.
*B22F 10/32* (2021.01)
*B22F 10/28* (2021.01)
(Continued)

(52) U.S. Cl.
CPC .............. *B22F 10/32* (2021.01); *B22F 10/28* (2021.01); *B22F 12/41* (2021.01); *B22F 12/70* (2021.01);
(Continued)

(58) Field of Classification Search
CPC .......... B22F 10/32; B22F 10/28; B22F 12/41; B22F 12/70; B33Y 10/00; B33Y 30/00;
(Continued)

(56) References Cited

U.S. PATENT DOCUMENTS

| 2014/0140882 A1 | 5/2014 | Syassen |
| 2016/0207147 A1 | 7/2016 | Van Hassel |
| 2018/0117713 A1* | 5/2018 | Foret ...................... B22F 10/30 |

FOREIGN PATENT DOCUMENTS

| CN | 105382257 A | 3/2016 |
| CN | 107008900 B | 8/2019 |

(Continued)

OTHER PUBLICATIONS

Notification of the First Office Action mailed Aug. 18, 2023 in Chinese Application No. 202080078173.9, with English translation, 17 pages.
(Continued)

*Primary Examiner* — JaMel M Nelson
(74) *Attorney, Agent, or Firm* — Nixon & Vanderhye P.C.

(57) ABSTRACT

An object of the present invention is to provide a laminating-printing system which can further improve the quality of laminated-printed objects. The present invention provides a laminating-printing system including a laminating-printing unit (10) which prints the layers and sequentially laminates the layers; and a concentration adjusting unit (30) which adjusts the concentration of gas components in the shield gas, the laminating-printing unit (10) including: an irradiation section including an irradiation source of energy rays to irradiate the powder material, and a printing section including a chamber filled with the shield gas and a printing stage on which the layers are printed and laminated, and the concentration adjusting unit (30) including: a purification section which removes a first gas component which is an impurity in the shield gas based on the powder material; and
(Continued)

a supply section which supplies a second gas component selected based on the powder material inside of the chamber as needed.

3 Claims, 5 Drawing Sheets

(51) Int. Cl.
*B22F 12/41* (2021.01)
*B22F 12/70* (2021.01)
*B33Y 10/00* (2015.01)
*B33Y 30/00* (2015.01)
*B33Y 40/00* (2020.01)

(52) U.S. Cl.
CPC ............... *B33Y 10/00* (2014.12); *B33Y 30/00* (2014.12); *B33Y 40/00* (2014.12)

(58) Field of Classification Search
CPC ..... B33Y 40/00; B29C 64/118; B29C 64/255; B29C 64/264; B29C 64/268; B29C 64/273; B29C 64/364; B29C 64/371; B29C 64/393
See application file for complete search history.

(56) References Cited

FOREIGN PATENT DOCUMENTS

| | | |
|---|---|---|
| EP | 0289116 A1 | 11/1988 |
| EP | 3075470 A1 | 10/2016 |
| EP | 3147047 A1 | 3/2017 |
| EP | 3318351 A1 | 5/2018 |
| EP | 3560714 A1 | 10/2019 |
| EP | 3578342 A1 | 12/2019 |
| EP | 3628419 A1 | 4/2020 |
| JP | 2015-202596 | 11/2015 |
| JP | 2016-074957 | 5/2016 |
| JP | 2018-184634 | 11/2018 |
| WO | WO 2019/053386 A1 | 3/2019 |
| WO | WO 2019/204421 A1 | 10/2019 |

OTHER PUBLICATIONS

Extended European Search Report mailed Nov. 7, 2023 in European Application No. 20888266.2, 11 pages.
International Search Report for PCT/JP2020/042502, dated Jan. 12, 2021, with English Translation (4 pages).

* cited by examiner

LAMINATING-PRINTING SYSTEM AND LAMINATING-PRINTING METHOD

This application is the U.S. national phase of International Application No. PCT/JP2020/042502 filed Nov. 13, 2020, which designated the U.S. and claims priority to JP 2019-205956 filed Nov. 14, 2019, the entire contents of each of which are hereby incorporated by reference.

TECHNICAL FIELD

The present invention relates to a laminating-printing system and a laminating-printing method.

BACKGROUND ART

An additive manufacturing technology called "Additive Manufacturing" is known. As an example of the additive manufacturing technology, a laminating-printing apparatus is known in which a powder material such as a resin or a metal is formed into a layer having an arbitrary shape, and the produced layers are sequentially laminated to produce a laminated-printed object having an arbitrary shape.

As an example of the laminating-printing apparatus used in the additive manufacturing technique, a metal 3D printer which sinters metal powder on a printing stage with a laser or the like is known. In the metal 3D printer, sintered metal layers are sequentially laminated on a printing stage, and an object having a complicated shape can be produced accurately in a short time. Therefore, metal 3D printer is attracting attention as a promising technology in advanced technology fields such as the aircraft industry and medical treatment (for example, Patent Document 1).

The laminating-printing apparatus disclosed in Patent Document 1 includes a printing chamber filled with an inert gas and a laser irradiation section which irradiates a predetermined part of the powder material layer with laser beam to sinter the powder material to produce a sintered body. In a conventional metal 3D printer such as the laminating-printing apparatus disclosed in Patent Document 1, it is general to improve the quality by controlling the parameters and characteristics of the laser beam, the thickness of the metal layer, and the like.

PRIOR ART DOCUMENTS

Patent Documents

Patent Document 1: Japanese Unexamined Patent Application, First Publication No. 2016-74957

SUMMARY OF INVENTION

Problem to be Solved by the Invention

The laminating-printing apparatus is required to further improve the quality of the laminated-printed object. In order to improve the quality, it is desirable to optimize the concentration of the gas component in the printing chamber based on the material of the metal powder to be sintered, etc., and keep the optimized concentration constant.

However, the laminating-printing apparatus disclosed in Patent Document 1 does not have a function of optimizing the concentration of the gas components in the printing chamber based on the material of the metal powder. In addition, there is no function to keep the concentration of the gas components in the printing chamber constant depending on the material of the metal powder. Therefore, in the laminating-printing apparatus disclosed in Patent Document 1, the quality of the laminated-printed object cannot be further improved depending on the powder material used.

An object of the present invention is to provide a laminating-printing system which can further improve the quality of laminated-printed objects.

Means for Solving the Problem

[1] A laminating-printing system in which heat is supplied to a powder material using energy rays in the presence of a shield gas to print layers, and the layers are sequentially laminated to produce a laminated-printed object,
wherein the laminating-printing system includes:
a laminating-printing unit which prints the layers and sequentially laminates the layers; and
a concentration adjusting unit which adjusts the concentration of gas components in the shield gas;
the laminating-printing unit includes:
an irradiation section including an irradiation source of energy rays to irradiate the powder material, and
a printing section including a chamber filled with the shield gas and a printing stage on which the layers are printed and laminated, and
the concentration adjusting unit includes:
a purification section which removes a first gas component which is an impurity in the shield gas based on the powder material; and
a supply section which supplies a second gas component selected based on the powder material inside of the chamber as needed.

[2] The laminating-printing system according to [1],
wherein the laminating-printing system further includes a first supply line which supplies a part of the shield gas in the chamber into the purification section, and
the purification section includes at least one selected from the group consisting of the following first purification tower, second purification tower, third purification tower, and fourth purification tower, which are connected with the first supply line:
first purification tower: purification tower which removes oxygen from the shield gas;
second purification tower: purification tower which removes water from the shield gas
third purification tower: purification tower which removes nitrogen from the shield gas
fourth purification tower: purification tower which removes water and does not remove oxygen from the shield gas.

[3] The laminating-printing system according to [2],
wherein the purification section further includes at least one selected from the group consisting of the following first bypass line, second bypass line, third bypass line, and fourth bypass line:
first bypass line: bypass line in which the shield gas supplied from the first supply line is supplied to the secondary side of the first purification tower without being supplied to the first purification tower;
second bypass line: bypass line in which the shield gas supplied from the first supply line is supplied to the secondary side of the second purification tower without being supplied to the second purification tower;
third bypass line: bypass line in which the shield gas supplied from the first supply line is supplied to the secondary side of the third purification tower without being supplied to the third purification tower;

fourth bypass line: bypass line in which the shield gas supplied from the first supply line is supplied to the secondary side of the fourth purification tower without being supplied to the fourth purification tower.

[4] The laminating-printing system according to any one of [1] to [3],
  wherein the supply section includes a source of a second gas component which is at least one selected from the group consisting of hydrogen, oxygen, carbon monoxide, carbon dioxide, and ammonia.

[5] The laminating-printing system according to any one of [1] to [4],
  wherein the laminating-printing system further includes:
  a second supply line which supplies gas from which the first gas component has been removed from the shield gas by the purification section into the chamber; and
  a third supply line which supplies the second gas component to the gas in the second supply line as needed.

[6] A laminating-printing method in which heat is supplied to a powder material using energy rays in the presence of a shield gas to print layers, and the layers are sequentially laminated to produce a laminated-printed object,
  wherein the laminating-printing method includes:
  a step (a) of printing the layers and sequentially laminating the printed layers; and
  a step (b) of adjusting the concentration of gas components in the shield gas, and
  wherein, in the step (a), the powder material in the chamber is irradiated with the energy rays, a layer is printed in the chamber, and printed layers are sequentially laminated, and
  in the step (b), a first gas component which is an impurity in the shield gas is removed based on the powder material, and a second gas component selected based on the powder material is supplied into the chamber as needed.

[7] A laminating-printing method according to [6],
  wherein, in the step (b), at least one gas component selected from the group consisting of oxygen, water, and nitrogen is removed from the shield gas as the first gas component.

[8] A laminating-printing method according to [6] or [7],
  wherein, in the step (b), at least one gas component selected from the group consisting of hydrogen, oxygen, carbon monoxide, carbon dioxide, and ammonia is supplied into the shield gas as the second gas component.

[9] A laminating-printing method according to any one of [6] to [8],
  wherein, in the step (b), the first gas component is changed based on the type of the powder material.

[10] A laminating-printing method according to any one of [6] to [9],
  wherein, the second gas component is supplied to gas from which the first gas component has been removed in the step (b) as needed.

Effects of the Invention

According to the present invention, it is possible to provide a laminating-printing system which can further improve the quantity of the laminated-printed object.

DETAILED DESCRIPTION OF THE PREFERRED EMBODIMENTS

<Laminating-Printing System>

The laminating-printing system according to the present embodiment (hereinafter referred to as "the present laminating-printing system") supplies heat to a powder material using energy rays to print layers in the presence of shield gas, and then laminates the layers in sequence to produce a laminated-printed object. The laminating-printing system includes a laminating-printing unit and a concentration adjusting unit.

In the laminating-printing unit, heat is supplied to the powder material using energy rays to print the layers in the presence of shield gas, and the layers are sequentially laminated.

The laminating-printing unit includes an irradiation section including an irradiation source of an energy ray to irradiate the powder material, and a printing section including a chamber and a printing stage. The chamber is filled with shield gas. The shield gas is an inert gas for reducing an oxygen concentration in the atmosphere around the powder material when irradiated with energy rays.

In the laminating-printing system, the energy rays are not particularly limited. For example, a laser, an electron beam and the like can be used. Then, on the printing stage, the layers are printed by energy rays and the printed layers are laminated.

The concentration adjusting unit adjusts the concentration of gas components in the shield gas. The concentration adjusting unit includes a purification section and a supply section. The purification section removes a first gas component, which is an impurity in the shield gas, depending on the powder material. The supply section supplies a second gas component selected based on the powder material into the chamber as needed.

Hereinafter, an embodiment of the present invention will be described in detail with reference to the figures. However, in the figures used in the following explanation, in order to make the features easier to understand, the featured parts may be enlarged for convenience, and the dimensional ratios of each component may not be the same as the actual ones.

Figure 1:
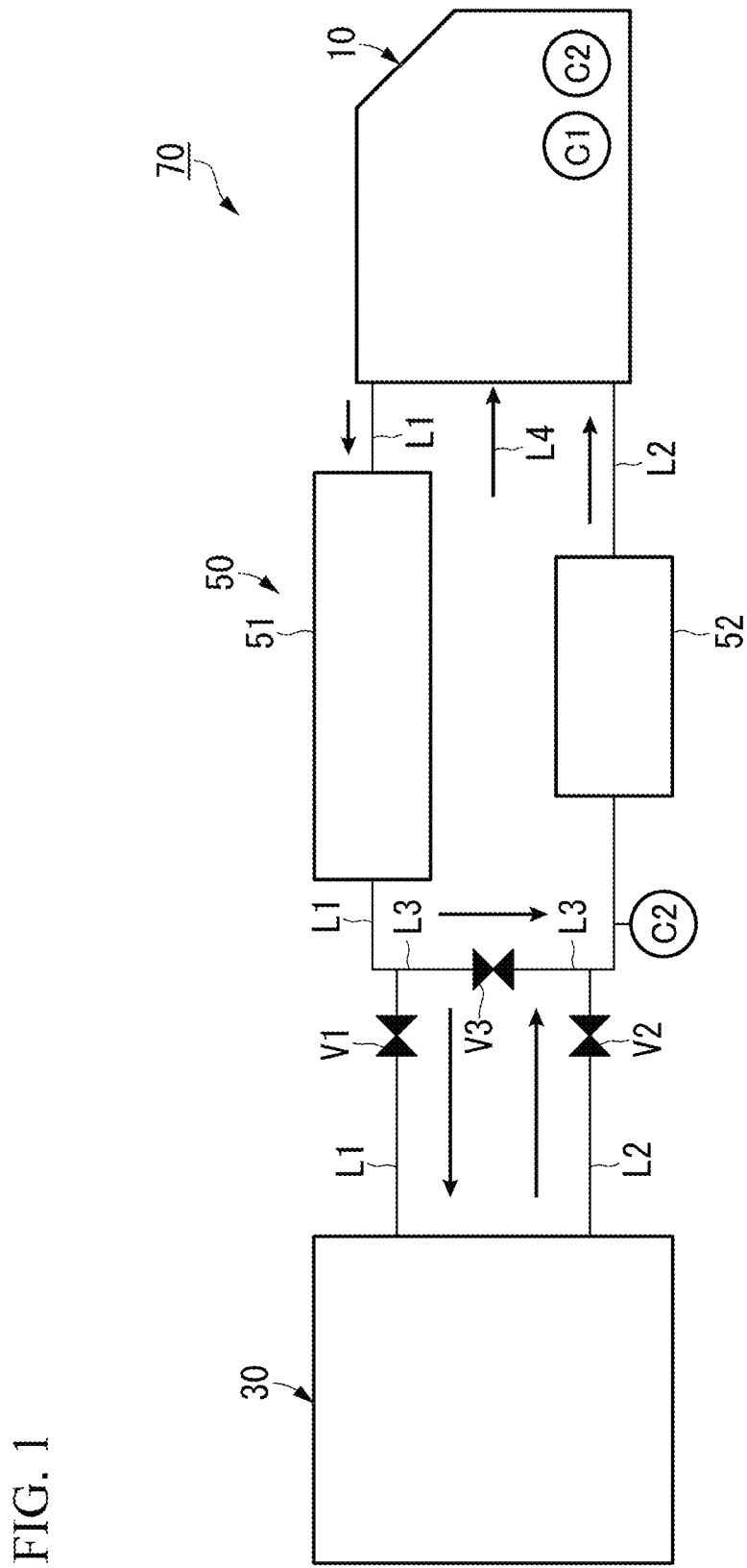
FIG. 1 is a schematic diagram showing an embodiment of the laminating-printing system according to the present invention.

FIG. 1 is a schematic diagram showing an embodiment of the laminating-printing system. A laminating-printing system 70 shown in FIG. 1 includes a laminating-printing unit 10, a concentration adjusting unit 30, a filter unit 50, a first supply line L1, a second supply line L2, a circulation line L3, and solenoid valves V1 to V3. The laminating-printing system 70 is a system which supplies heat to a powder material using energy rays to print layers in the presence of a shield gas, and sequentially laminate the layers to produce a laminated-printed object.

The laminating-printing unit 10 supplies heat to the powder material using energy rays in the presence of a shield gas to print the layers, and sequentially laminates the printed layers. The concentration adjusting unit 30 adjusts the concentration of the gas components in the shield gas. The filter unit 50 removes solid impurities such as fumes and sputter in the shield gas.

The first supply line L1 supplies a part of the shield gas in a chamber 3 (details will be described later) included in the laminating-printing unit 10 to the purification section of the concentration adjusting unit 30. The first supply line L1 connects the chamber 3 and a first purification tower 31, which will be described later. The solenoid valve V1 is provided in the first supply line L1. When the solenoid valve V1 is in the open state, the first supply line L1 supplies the shield gas in the chamber 3 to the purification section of the concentration adjusting unit 30.

The second supply line L2 supplies gas from which the first gas component has been removed from the shield gas by the purification section of the concentration adjusting unit 30 into the chamber 3. The second supply line L2 connects a fourth purification tower 34, which will be described later, to the chamber 3. The second supply line L2 is provided with the solenoid valve V2. When the solenoid valve V2 is in the open state, the second supply line L2 introduces gas from which the first gas component, which is an impurity in the shield gas, has been removed from the shield gas by the purification section of the concentration adjusting unit 30 into the chamber 3.

The circulation line L3 connects the first supply line L1 on the primary side of the solenoid valve V1 and the second supply line L2 on the secondary side of the solenoid valve V2. Here, the upstream side in the direction in which the gas in the first supply line L1 flows from the laminating-printing unit 10 to the concentration adjusting unit 30 is the primary side, and the downstream side is the secondary side. Further, the upstream side in the direction in which the gas in the second supply line L2 flows from the concentration adjusting unit 30 to the laminating-printing unit 10 is the primary side, and the downstream side is the secondary side.

The solenoid valve V3 is provided on the circulation line L3. When the solenoid valve V3 is in the open state and both the solenoid valves V1 and V2 are in the closed state, the laminating-printing system 70 introduces a part of the shield gas in the chamber 3 into the first supply line L1. The shield gas in the first supply line L1 is supplied again into the chamber 3 via the circulation line L3 and the second supply line L2 in this order.

When the solenoid valves V1, V2, and V3 are all in the open state, the laminating-printing system 70 introduces a part of the shield gas in the chamber 3 into the first supply line L1 and then supplies it to the concentration adjusting unit 30. Then, the remaining shield gas is supplied again into the chamber 3 via the second supply line L2.

In the laminating-printing system 70, the solenoid valves V1 to V3 are electrically connected to a CPU 37 described later. The open/closed state of each solenoid valve can be controlled by the CPU 37.

Figure 2:
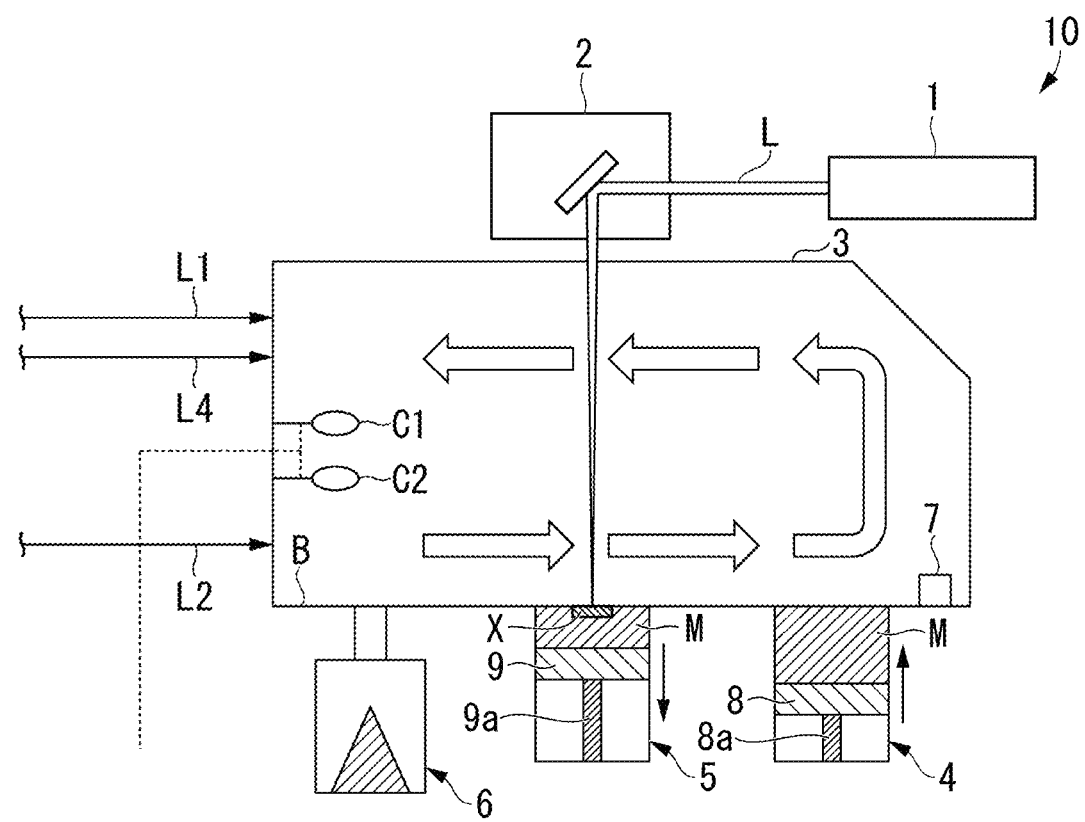
FIG. 2 is a schematic diagram showing a laminating-printing unit provided with the laminating-printing system shown in FIG. 1.

FIG. 2 is a schematic diagram showing the laminating-printing unit 10 included in the laminating-printing system 70. As shown in FIG. 2, the laminating-printing unit 10 includes a laser oscillator 1, an optical system 2, a chamber 3, a storage chamber 4, a printing chamber 5, a recovery chamber 6, a recoater 7, a storage stage 8, a printing stage 9, a first densitometer C1, and a second densitometer C2. In the laminating-printing unit 10, heat is supplied to the powder material M on the printing stage 9 by irradiation with a laser L (an example of an energy ray) using the laser oscillator 1, the layers are printed, and the printed layers are sequentially laminated to produce a laminated-printed object X.

The laminating-printing unit 10 includes an irradiation section and a printing section.

The irradiation section includes an irradiation source of energy rays to irradiate the powder material M. The irradiation section includes the laser oscillator 1 and the optical system 2.

The printing section includes the chamber 3 filled with a shield gas and the printing stage 9 on which layers are printed and laminated. The printing section includes the chamber 3, the printing chamber 5, and the printing stage 9.

(Irradiation Section of Laminating-Printing Unit 10)

The irradiation section of the laminating-printing unit 10 includes the laser oscillator 1 as an irradiation source of energy rays. The laser oscillator 1 is an example of an irradiation source of energy rays. In another example of the present embodiment, the irradiation source of the energy ray may be an irradiation source other than the laser oscillator.

The laser oscillator 1 irradiates the powder material M with the laser L as an energy ray. The laser oscillator 1 is not particularly limited as long as it can irradiate the powder material M on the printing stage 9 with the laser L. The laser oscillator 1 irradiates the powder material M in the chamber 3 with the laser L via the optical system 2. Thereby, the laminating-printing unit 10 can sinter or melt and solidify the powder material M at the position irradiated with the laser L. As a result, a layer containing a sintered product of the powder material M or a molten solidified material of the powder material M (hereinafter referred to as "printed layer") is printed.

The optical system 2 is not particularly limited as long as it can control the irradiation position of the laser L in the powder material M on the printing stage 9 based on preset data. As an example of the optical system 2, for example, a system having one or more reflecting mirrors can be mentioned.

The laminating-printing unit 10 can control the irradiation position of the laser L on the powder material M by controlling the optical system 2 based on the preset data. As a result, the laminating-printing unit 10 can print a printing layer having an arbitrary shape.

Examples of the powder material M include powders of carbon, boron, magnesium, calcium, chromium, copper, iron, manganese, molybdenum, cobalt, nickel, hafnium, niobium, titanium, aluminum and the like. As the powder material M, metals such as chromium, copper, iron, manganese, molybdenum, cobalt, nickel, hafnium, niobium, titanium, and aluminum, and alloys thereof are preferable. Examples of alloys include stainless-steel alloys and nickel alloys, and titanium alloys.

Among these, cobalt, nickel, hafnium, niobium, titanium, aluminum, stainless steel alloy, nickel alloy, aluminum alloys, and titanium alloys are preferable because it is expected that the effect of the present invention can be remarkably obtained.

When the powder material M is in the form of particles, the particle size of the powder material M is not particularly limited, but can be, for example, about 10 to 200 μm.

(Printing Section of Laminating-Printing Unit 10)

The printing section of the laminating-printing unit 10 includes the chamber 3, the printing chamber 5, and the printing stage 9. In addition to the chamber 3, the printing chamber 5, and the printing stage 9, the storage chamber 4, the recovery chamber 6, the recoater 7, and the storage stage 8 may also be regarded as the configuration of the printing section of the laminating-printing unit 10.

The chamber 3 is a container filled with shield gas. Each of the primary end of the first supply line L1, the secondary end of the second supply line L2, and the secondary end of the shield gas supply line L4 is connected to the chamber 3. The primary end of the shield gas supply line L4 is connected to a source of the shield gas (not shown). The chamber 3 is filled with the shield gas via the shield gas supply line L4.

In addition, the end of the purge line (not shown) is connected to the chamber 3. The purge line (not shown) discharges the gas in the chamber 3 to the outside of the chamber 3 when the shield gas is filled (corresponding to a step (c) described later).

The shield gas is a gas for reducing oxygen inside of the chamber 3. Examples of the shield gas include nitrogen gas, helium gas, argon gas, and a mixed gas containing any combination of these gases.

The shield gas usually has a predetermined composition. By supplying the shield gas to the inside of the chamber 3, the laser L of the required amount of energy can be stably irradiated to the powder material M, and the printed layer having a desired property can be reliably printed, and the quality of the laminated-printed object is improved.

In addition, by supplying the shield gas inside of the chamber 3, the oxygen concentration in the atmosphere around the powder material M can be reduced as much as possible during printing and laminating of the printed layer. Therefore, the mechanical properties of the laminated-printed object can be improved, the deterioration of the shape can be reduced, and the quality of the laminated-printed object can be improved.

The storage chamber 4, the printing chamber 5, and the recovery chamber 6 are formed on the bottom surface B of the chamber 3. The storage chamber 4, the printing chamber 5, and the recovery chamber 6 have, for example, a columnar space. The shape of the columnar space is not particularly limited. The shape may be, for example, a circular columnar shape, a polygonal columnar shape, or the like.

In the laminating-printing unit 10, the storage chamber 4, the printing chamber 5, and the recovery chamber 6 are formed below the bottom surface B of the chamber 3. However, in another example of the present embodiment, each of the storage chamber, the storage chamber, the printing chamber, and the recovery chamber may be provided on the upper surface of a pedestal provided on the bottom surface B of the chamber 3. The pedestal is for performing operations such as storing, supplying, recovering, printing by supplying heat to the powder material M, and laminating of the printed layers. In addition, in another example of the present embodiment, each of the storage chamber, the printing chamber, and the recovery chamber may be provided outside the chamber 3 so as to communicate with the inside of the chamber 3.

The storage chamber 4 has a space formed downward from the bottom surface B of the chamber 3. The storage stage 8 is arranged in the storage chamber 4. The powder material M before printing of the printed layer is placed on the upper side of the storage stage 8. As described above, the storage chamber 4 stores the unused powder material M in the space on the storage stage 8.

The storage stage 8 is supported by a movable rod 8a which can move up and down. Due to the vertical movement of the movable rod 8a, the storage stage 8 moves up and down inside of the storage chamber 4 along the inner wall of the storage chamber 4. As the storage stage 8 moves upward, the powder material M placed on the upper surface of the storage stage 8 protrudes above the bottom surface B of the chamber 3. In the laminating-printing unit 10, the powder material M on the storage stage 8 protruding above the bottom surface B of the chamber 3 is conveyed to the upper side of the printing stage 9 by moving the recoater 7 in the left-right direction.

The printing chamber 5 has a space formed downward from the bottom surface B of the chamber 3. The printing stage 9 is arranged in the printing chamber 5. The printing stage 9 is supported by a movable rod 9a which can move up and down. Due to the vertical movement of the movable rod 9a, the printing stage 9 moves up and down inside of the printing chamber 5 along the inner wall of the printing chamber 5.

The powder material M to be irradiated with the laser L is placed on the upper side of the printing stage 9. Normally, the powder material M on the printing stage 9 is transferred from the storage stage 8 by the recoater 7.

In the laminating-printing unit 10, the printed layer is produced by irradiating the powder material M on the printing stage 9 with the laser L. Then, printing and laminating of the printed layer are repeated on the printing stage 9.

The printing and laminating of the printed layer on the printing stage 9 will be described by taking as an example a state in which the powder material M on the printing stage 9 is irradiated with the laser L and the printed layer of an arbitrary shape is printed.

When the printed layer of any shape is printed, the movable rod 9a moves downward, the printing stage 9 moves downward, and a new powder material M is transferred from the top of the storage stage 8 by the recoater 7 and spread on the upper side of the printed layer having any shape. In this state, when printing of a new printed layer (the shape is arbitrary) by irradiation with laser L is further performed, a new printed layer is laminated on the top of the printed layer of any shape which has already been printed. After that, the printing stage 9 moves further downward, and another new powder material M is further supplied from the storage stage 8. Then, when the laser L is irradiated, another new printed layer is further provided on the upper side of the already laminated printed layer and laminated. In this way, printing of the printed layer and laminating of the printed layer are sequentially performed on the printing stage 9.

Since the laminating-printing unit 10 includes the laser oscillator 1, the storage stage 8, and the printing stage 9, it is possible to repeatedly irradiate the laser L, lower the printing stage 9, and supply a new powder material M. As a result, the laminated-printed object X can be produced by sequentially laminating the printed layers. By the time the laminated-printed object X is completed, the printing stage 9 is lowered to a position at which the upper end of the laminated-printed object X is at the same height as the bottom surface B of the chamber 3.

The recovery chamber 6 has a space formed downward from the bottom surface B of the chamber 3.

The powder material after printing the printed layer is the powder material remaining on the portion not irradiated with the laser L on the printing stage 9. The powder material around the powder material M irradiated with the laser L on the printing stage 9 is altered by high heat conducted from the portion irradiated with the laser L even if the laser L is not directly irradiated. Therefore, the powder material around the powder material M irradiated with the laser L is transferred to the recovery chamber 6 as the powder material after printing of the printed layer. As described above, the recovery chamber 6 is for recovering the powder material after use.

The first densitometer C1 measures the oxygen concentration in the chamber 3. The first densitometer C1 is electrically connected to the CPU 37 described later. The second densitometer C2 measures the water concentration in the chamber 3. The second densitometer C2 is electrically connected to the CPU 37 described later.

In the laminating-printing system 70, the first densitometer C1 and the second densitometer C2 are arranged in the chamber 3. The location of the first densitometer C1 and the second densitometer C2 is not particularly limited as long as they can measure the oxygen concentration and the water concentration in the gas in the second supply line L2 supplied in the chamber 3.

Figure 3:
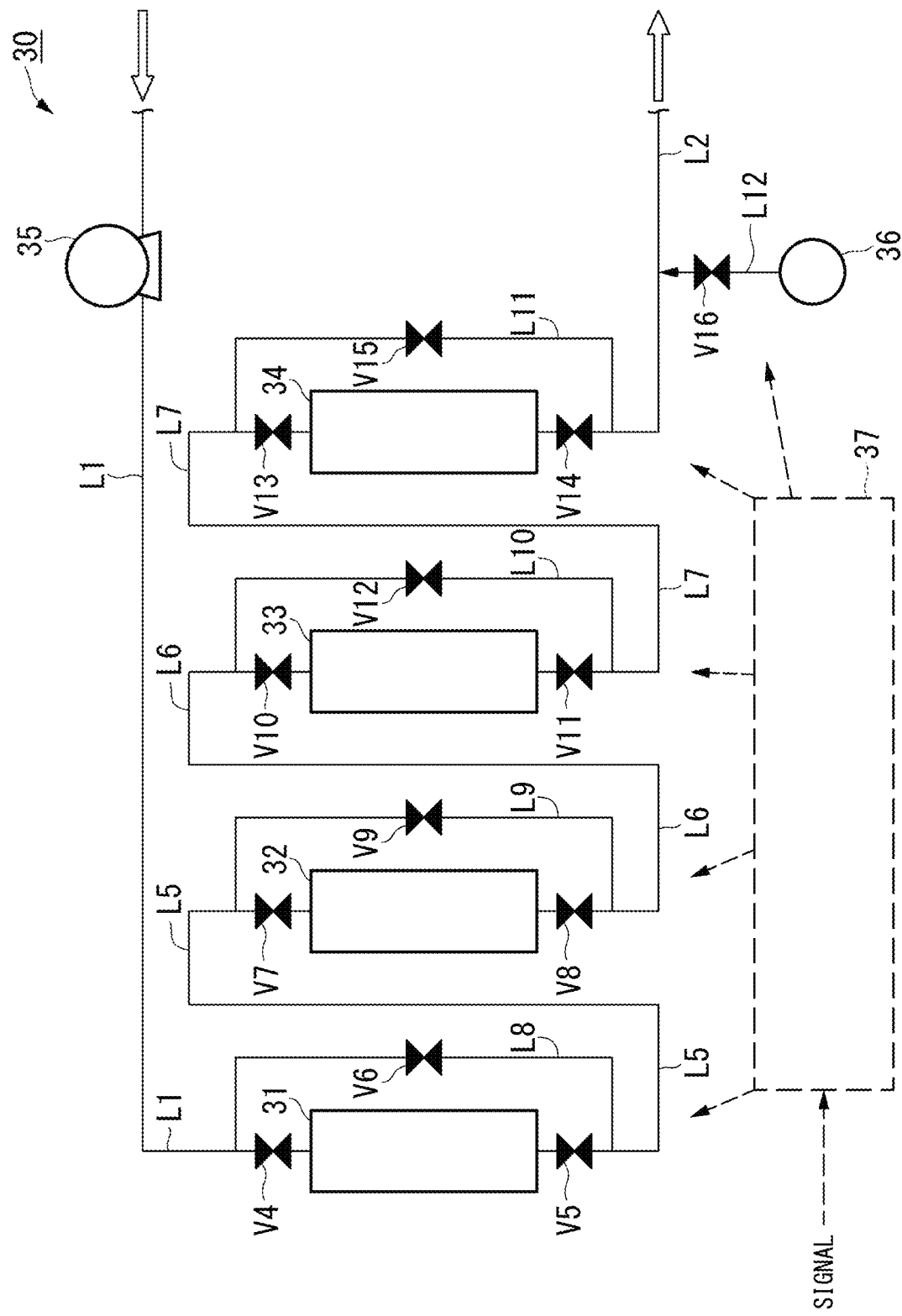
FIG. 3 is a schematic diagram showing a concentration adjusting unit provided with the laminating-printing system shown in FIG. 1.

FIG. 3 is a schematic diagram showing the concentration adjusting unit 30 provided with the laminating-printing system 70. As shown in FIG. 3, the concentration adjusting unit 30 includes the first purification tower 31, a second purification tower 32, a third purification tower 33, a fourth purification tower 34, a blower 35, and a second gas component supply source 36, a CPU 37, a first connection line L5, a second connection line L6, a third connection line L7, a first bypass line L8, a second bypass line L9, a third bypass line L10, a fourth bypass line L11, a third supply line L12, and electromagnetic valves V4 to V16.

The concentration adjusting unit 30 includes a purification section, a supply section, and a control section.

The purification section removes the first gas component, which is an impurity in the shield gas in the chamber 3, based on the powder material M.

The purification section in the concentration adjusting unit 30 includes the first purification tower 31, the second purification tower 32, the third purification tower 33, the fourth purification tower 34, the blower 35, the first connection line L5, the second connection line 6, the third connection line L7, the first bypass line L8, the second bypass line L9, the third bypass line L10, the fourth bypass line L11, and the electromagnetic valves V4 to V15.

The supply section supplies the second gas component selected based on the powder material M into the chamber 3 as needed.

The supply section in the concentration adjusting unit 30 includes the second gas component supply source 36, the third supply line L12, and the solenoid valve V16.

The control section determines whether or not the first gas component and the second gas component are supplied based on the powder material M. When the control section determines to supply the second gas component, the control section further determines the gas type of the second gas component based on the powder material M. In the concentration adjusting unit 30, the CPU 37 constitutes the control section.

As shown in FIG. 3, the blower 35 is provided in the first supply line L1. The blower 35 sucks the shield gas in the first supply line L1 and supplies a part of the shield gas in the chamber 3 into the first purification tower 31, the second purification tower 32, the third purification tower 33, and the fourth purification tower 34.

The CPU 37 determines whether or not the first gas component and the second gas component are supplied based on the powder material M, and instructs the solenoid valves V4 to V16. When supplying the second gas component, the CPU 37 further determines the gas type of the second gas component based on the powder material M, and instructs the supply source 36 of the second gas component.

The CPU 37 may have a program which can automatically determine the instruction regarding the first gas component and the second gas component based on the powder material M. The user of the laminating-printing system 70 may have a switch button which can manually determine the instruction regarding the first gas component and the second gas component based on the powder material M.

The CPU 37 receives information regarding the gas type of the powder material M as an external signal. The CPU 37 determines the gas type of the first gas component in the purification section based on information (external signal) such as the material of the powder material M. The CPU 37 may determine the first gas component based on the measured values of the oxygen concentration and the water concentration in the chamber 3 transmitted from the first densitometer C1 and the second densitometer C2, in addition to material information of the powder material M.

The CPU 37 determines whether or not to supply the second gas component based on information (external signal) such as the material of the powder material M. Then, when the CPU 37 determines to supply the second gas component, the CPU 37 determines the gas type of the second gas component. For example, when the CPU 37 is given information such as the material of the powder material M as an external signal and can expect the quality improvement of the laminated-printed object X by supplying the second gas component, the CPU 37 determines the supply of the second gas component, and determines the gas type of the second gas component based on the powder material M.

The CPU 37 is electrically connected to each of the solenoid valves V1 to V3, the first densitometer C1 and the second densitometer C2, as well as each of the second gas component supply source 36 and the solenoid valves V4 to V16. As a result, the CPU 37 can instruct the open/closed state of the solenoid valves V4 to V16 as an instruction signal regarding the gas type of the first gas component determined. Therefore, in the purification section of the concentration adjusting unit 30, the CPU 37 can instruct which one of the first purification tower 31, the second purification tower 32, the third purification tower 33, and the fourth purification tower 34 is used for removing impurities in the shield gas in the chamber 3.

When the CPU 37 determines whether or not to supply the second gas component, the CPU 37 can instruct the open/closed state of the solenoid valve V16 as an instruction signal regarding whether or not to supply the second gas component.

When supplying the second gas component, the CPU 37 instructs the solenoid valve V16 to be in the open state. When supplying the second gas component, the CPU 37 determines the second gas component, transmits an instruction signal regarding the gas type of the determined second gas component to the supply source 36, and transmits the instruction signal of the determined second gas component to the supply source 36.

When the second gas component is not supplied, the CPU 37 instructs the solenoid valve V16 to be in the closed state.

With the concentration adjusting unit 30 having a CPU 37 as the control section, it is possible to determine which one of the first purification tower 31, the second purification tower 32, the third purification tower 33, and the fourth purification tower 34 is used for purifying the shield gas, and determine whether or not to supply the second gas component, and if necessary, determine the gas type of the second gas component.

In the laminating-printing system 70 of the present embodiment, the concentration adjusting unit 30 includes the CPU 37. However, in another embodiment, the laminating-printing system may include the CPU 37, and the CPU 37 and the concentration adjusting unit 30 may be independent of each other.

(Purification Section of Concentration Adjusting Unit 30)

The purification section of the concentration adjusting unit 30 removes the first gas component, which is an impurity in the shield gas, based on the powder material M. In the concentration adjusting unit 30, the CPU 37 determines which one of the first purification tower 31, the second purification tower 32, the third purification tower 33, and the fourth purification tower 34 is used to purify the shield gas, and the first gas component is determined.

In the concentration adjusting unit 30, the first gas component is oxygen, water (water vapor), and nitrogen. However, in another embodiment, as the first gas component, a gas component of another chemical species may be adopted in addition to the gas component of these chemical species.

The first gas component can be selected, for example, depending on the material of the powder material M. The first gas component may be one kind or a combination of a plurality of kinds of gas components.

As an example, when the powder material M is a stainless steel alloy or a nickel alloy, since the mechanical properties of the laminated-printed object X are excellent, the first gas component is preferably a combination of two kinds of gas components, oxygen and moisture.

When the powder material M is an aluminum alloy, since the pores of the laminated-printed object X are reduced and the mechanical properties are excellent, the first gas component is preferably only one gas component of water.

When the powder material M is a titanium alloy, since the pores of the laminated-printed object X are reduced and the mechanical properties are excellent, the first gas component is preferably a combination of three gas components of oxygen, water and nitrogen.

The first purification tower 31 removes oxygen from the shield gas as the first gas component. The first purification tower 31 is filled with an adsorbent capable of adsorbing oxygen, such as a nickel-based catalyst or a zinc-based catalyst. The adsorbent filled in the first purification tower 31 is preferably one capable of removing 99.99% or more of oxygen with respect to the oxygen in the gas introduced into the first purification tower 31. The first purification tower 31 is used when the quality of the laminated-printed object can be expected to be improved by removing oxygen from the shield gas in the chamber 3 in consideration of the material of the powder material M.

The first purification tower 31 is connected to the secondary end of the first supply line L1. The solenoid valve V4 is provided near the end on the secondary side of the first supply line L1. When the solenoid valve V4 is in the open state, a part of the shield gas in the chamber 3 is supplied to the first purification tower 31 via the first supply line L1. In this case, the first purification tower 31 removes oxygen as the first component from the shield gas supplied to the inside thereof.

The first connection line L5 connects the secondary end of the first purification tower 31 and the primary end of the second purification tower 32. The solenoid valve V5 is provided near the primary end of the first connection line L5. When the solenoid valve V5 is in the open state, the first connection line L5 can supply the gas in the first purification tower 31 to each one located on the secondary side with respect to the first purification tower 31 in the concentration adjusting unit 30 such as the second purification tower 32.

In the concentration adjusting unit 30, the upstream side in the direction in which the gas in the chamber 3 flows to the second supply line L2 via the first supply line L1 and the connection lines L5 to L7 is the primary side, and the downstream side is the secondary side.

The first bypass line L8 connects the first supply line L1 on the primary side of the solenoid valve V4 and the first connection line L5 on the secondary side of the solenoid valve V5. Further, the solenoid valve V6 is provided on the first bypass line L8.

When both the solenoid valves V4 and V5 are in the closed state and the solenoid valve V6 is in the open state, the shield gas in the first supply line L1 is supplied to the second purification tower 32 on the secondary side of the first purification tower 31 via the first bypass line L8 without being supplied to the first purification tower 31.

On the other hand, when the solenoid valve V6 is in the closed state and both the solenoid valves V4 and V5 are in the open state, the concentration adjusting unit 30 supplies the shield gas in the first supply line L1 to the first purification tower 31. The gas from which oxygen has been removed in the first purification tower 31 can be supplied to the second purification tower 32.

The second purification tower 32 removes water from the shield gas as the first gas component. The second purification tower 32 is filled with an adsorbent capable of adsorbing water, such as a mixture of a nickel-based catalyst and zeolite. The adsorbent filled in the second purification tower 32 is preferably one capable of removing 99.99% or more of the water content with respect to the water content in the gas introduced into the second purification tower 32. The second purification tower 32 is used when the quality of the laminated-printed object can be expected to be improved by removing water from the shield gas in the chamber 3 in consideration of the material of the powder material M.

The second purification tower 32 is connected to the secondary end of the first connection line L5. The solenoid valve V7 is provided near the end on the secondary side of the first connection line L5. When the solenoid valve V7 is in the open state, gas is supplied to the second purification tower 32 from the inside of the first connection line L5. In this case, the second purification tower 32 removes water as the first component from the shield gas supplied to the inside thereof.

The second connection line L6 connects the secondary end of the second purification tower 32 and the primary end of the third purification tower 33. The solenoid valve V8 is provided near the primary end of the second connection line L6. When the solenoid valve V8 is in the open state, the gas in the second purification tower 32 is supplied to each one located on the secondary side with respect to the second purification tower 32 in the concentration adjusting unit 30 such as the third purification tower 33 via the second connection line L6

The second bypass line L9 connects the first connection line L5 on the primary side of the solenoid valve V7 and the second connection line L6 on the secondary side of the solenoid valve V8. Further, the solenoid valve V9 is provided on the second bypass line L9.

When both the solenoid valves V7 and V8 are in the closed state and the solenoid valve V9 is in the open state, the shield gas in the first connection line L5 is supplied to the third purification tower 33 on the secondary side of the second purification tower 32 via the second bypass line L9 without being supplied to the second purification tower 32.

On the other hand, when the solenoid valve V9 is in the closed state and both the solenoid valves V7 and V8 are in the open state, the gas in the first connection line L5 can be supplied to the second purification tower 32, and the gas from which the water has been removed in the second purification tower 32 can be supplied to the third purification tower 33.

The third purification tower 33 removes nitrogen from the shield gas as the first gas component. The third purification tower 33 is filled with an adsorbent capable of adsorbing nitrogen, such as silica gel. The adsorbent filled in the third purification tower 33 is preferably one capable of removing 99.99% or more of nitrogen with respect to the nitrogen in the gas introduced into the third purification tower 33. The third purification tower 33 is used when the quality of the laminated-printed object can be expected to be improved by removing nitrogen from the shield gas in the chamber 3 in consideration of the material of the powder material M.

The third purification tower 33 is connected to the secondary end of the second connection line L6. The solenoid valve V10 is provided near the end on the secondary side of the second connection line L6. When the solenoid valve V10 is in the open state, gas is supplied to the third purification tower 33 from the inside of the second connection line L6. In this case, the third purification tower 33 removes nitrogen as the first component from the shield gas supplied inside thereof.

The third connection line L7 connects the secondary end of the third purification tower 33 and the primary end of the fourth purification tower 34. The solenoid valve V11 is provided near the primary end of the third connection line L7. When the solenoid valve V11 is in the open state, the third connection line L7 can supply the gas in the third purification tower 33 to each one located on the secondary side with respect to the third purification tower 33 in the concentration adjusting unit 30 such as the fourth purification tower 34.

The third bypass line L10 connects the second connection line L6 on the primary side of the solenoid valve V10 and the third connection line L7 on the secondary side of the solenoid valve V11. Further, the solenoid valve V12 is provided on the third bypass line L10.

When both the solenoid valves V10 and V11 are in the closed state and the solenoid valve V12 is in the open state, the shield gas in the second connection line L6 is supplied to the fourth purification tower 34 on the secondary side of the third purification tower 33 via the third bypass line L10 without being supplied to the third purification tower 33.

On the other hand, when the solenoid valve V12 is in the closed state and both the solenoid valves V10 and V11 are in the open state, the gas in the second connection line L6 can be supplied to the third purification tower 33, and the gas from which nitrogen has been removed in the third purification tower 33 can be supplied to the fourth purification tower 34.

The fourth purification tower 34 removes water from the shield gas as the first gas component and does not remove oxygen. The fourth purification tower 34 is filled with an adsorbent capable of adsorbing water and not adsorbing oxygen, such as zeolite. The adsorbent filled in the fourth purification tower 34 is preferably one capable of removing 99.99% or more with respect to the water in the gas introduced into the fourth purification tower 34. The fourth purification tower 34 is used when the quality of the laminated-printed object can be expected to be improved by removing water from the shield gas in the chamber 3 and supplying oxygen to the shield gas as the second component in consideration of the material of the powder material M.

The fourth purification tower 34 is connected to the secondary end of the third connection line L7. The solenoid valve V13 is provided near the end on the secondary side of the third connection line L7. When the solenoid valve V13 is in the open state, gas is supplied to the fourth purification tower 34 from the inside of the third connection line L7. In this case, the fourth purification tower 34 removes water as the first component from the shield gas supplied to the inside thereof. Since the fourth purification tower 34 is filled with an adsorbent which does not adsorb oxygen, the fourth purification tower 34 does not remove oxygen from the shield gas supplied to the inside thereof.

The secondary end of the fourth purification tower 34 is connected to the primary end of the second supply line L2. The valve V14 is provided near the primary end of the second supply line L2. When the solenoid valve V14 is in the open state, the gas in the fourth purification tower 34 can be supplied to the second supply line L2.

The fourth bypass line L11 connects the third connection line L7 on the primary side of the solenoid valve V13 and the second supply line L2 on the secondary side of the solenoid valve V14. Further, the solenoid valve V15 is provided on the fourth bypass line L11.

When both the solenoid valves V13 and V14 are in the closed state and the solenoid valve V15 is in the open state, the shield gas in the third connection line L7 is supplied to the second supply line L2 on the secondary side of the fourth purification tower 34 via the fourth bypass line L11 without being supplied to the fourth purification tower 34 via the fourth bypass line L11.

On the other hand, when the solenoid valve V15 is in the closed state and both the solenoid valves V13 and V14 are in the open state, the gas in the third connection line L7 can be supplied to the fourth purification tower 34, and the gas from which only water has been removed can be supplied to the second supply line L2.

(Supply Section of Concentration Adjusting Unit 30)

The supply section of the concentration adjusting unit 30 supplies the second gas component selected based on the powder material M into the chamber 3 as needed. In the concentration adjusting unit 30, the CPU 37 determines whether or not the second gas component is supplied, and if necessary, determines the gas type of the second gas component. When supplying the second gas component, the second gas component can be selected, for example, depending on the material of the powder material M.

Examples of the second gas component include hydrogen, oxygen, carbon monoxide, carbon dioxide, ammonia, and helium. The second gas component may be one kind alone or a combination of a plurality of kinds of gas components.

For example, when the powder material M is an aluminum alloy, since the pores of the laminated-printed object X are reduced and the mechanical properties can be expected to be improved, oxygen is preferable as the second gas component. When the powder material M is a titanium-based alloy, since the printing speed can be expected to be improved, helium is preferable as the second gas component.

The source 36 of the second gas component is one or more sources selected from the group consisting of hydrogen, oxygen, carbon monoxide, carbon dioxide, ammonia, and helium. The supply source 36 of the second gas component may have a plurality of sources according to the number of gas types of the second gas component, and may have one supply source capable of selecting and changing the second gas component to be supplied from among a plurality of gas types.

The supply source 36 may be a PSA type gas generator or a gas cylinder. For example, when the second gas component is oxygen, the supply source 36 may be a PSA type oxygen generator, an oxygen cylinder, and the like. The supply source 36 of the second gas component is connected to the second supply line L2 via the third supply line L12.

The third supply line L12 supplies the gas in the second supply line L2 with the second gas component as needed. The solenoid valve V16 is provided on the third supply line L12. When the solenoid valve V16 is in the open state, the third supply line L12 can supply the second gas component selected by the supply source 36 to the gas in the second supply line L2.

The supply section of the concentration adjusting unit 30 having the configuration described above supplies the second gas component into the chamber 3 as needed via the third supply line L12 and the second supply line L2 in this order.

(Filter Unit 50)

As shown in FIG. 1, the filter unit 50 includes a filter 51 and a ventilator 52. The filter unit 50 takes out a part of the shield gas in the chamber 3 by the ventilator 52, and removes solid impurities such as fumes and sputter in the shield gas by the filter 51. By removing solid impurities such as fumes and sputter in the shield gas in the chamber 3, the quality of the laminated-printed object X can be further improved.

(Action Effect)

The laminating-printing system 70 described above is provided with the concentration adjusting unit 30. The concentration adjusting unit 30 includes the purification section which removes a first gas component, which is an impurity in the shield gas, based on the powder material. Therefore, the gas component which is an impurity in the shield gas can be removed by selecting one from the first purification tower, the second purification tower, the third purification tower, and the fourth purification tower based on the material of the powder material and the like. As a result, the concentration of the gas component in the shield gas in the chamber, which is unnecessary for the production of the metal printed object, or the gas component which causes the deterioration of the mechanical properties of the metal printed object, can be reduced depending on the powder material. Depending on the powder material, the quality of the metal printed object can be further improved.

In addition, the concentration adjusting unit 30 includes the supply section which supplies the second gas component selected based on the powder material into the chamber as needed. Therefore, the gas component expected to contribute to the quality improvement of the laminated-printed object X based on the material of the powder material can be supplied into the chamber and its concentration can be kept constant. As a result, the concentration of the second gas component in the shield gas in the chamber is optimized based on the powder material, and the quality of the metal printed object can be further improved based on the powder material.

The laminating-printing system of the present embodiment includes the concentration adjusting unit 30 and the circulation line L3, and the concentration adjusting unit 30 includes the purification section and the supply section. Therefore, according to the laminating-printing system of the present embodiment, a part of the shield gas in the chamber 3 can be taken out, and by adjusting the concentration of the shield gas by the concentration adjusting unit, solid impurities such as fumes and sputter can be removed. As a result, the composition of the gas component in the shield gas in the chamber 3 can be brought close to the concentration (target value) optimized for improving the quality of the metal printed object in an extremely short time. Further, the concentration of the second gas component in the chamber 3 can be adjusted to a target value as needed, and the target value can be stably maintained.

The laminating-printing system of the present embodiment includes the concentration adjusting unit 30, the first supply line L1, and the second supply line L2. Therefore, when filling the chamber 3 with the shield gas, after a part of the shield gas is taken out by the first supply line L1 and oxygen is removed from the shield gas by the purification section of the concentration adjusting unit 30, while supplying again the gas from which oxygen has been removed into the chamber 3 by the second supply line L2, oxygen can be purged from the inside of the chamber 3. As a result, the oxygen concentration can be reduced in an extremely short time and the consumption of the shield gas can be reduced as compared with the case in which the oxygen in the chamber is purged only by supplying the shield gas. Therefore, it is possible to produce a laminated-printed object with higher quality in a shorter time and more efficiently than the conventional laminating-printing apparatus.

In the laminating-printing system of the present embodiment, the concentration adjusting unit 30 and the filter unit 50 are provided separately from the laminating-printing unit 10. Therefore, the quality of various laminated-printed objects can be further improved by adding the concentration adjusting unit 30 and the filter unit 50 to a generally commercially available 3D printer.

<Laminating-Printing Method>

Hereinafter, the laminating-printing method according to the present embodiment will be specifically described with reference to FIGS. 1 to 3.

In the laminating-printing method according to the present embodiment (hereinafter, referred to as "the present laminating-printing method"), heat is supplied to the powder material using energy rays in the presence of the shield gas to print the layer, and sequentially laminate the layer to produce a laminated-printed object. In the following description, the present laminating-printing method will be described by taking the case of using the laminating-printing system 70 as an example, but the present invention is not limited to the following description.

The present laminating-printing method includes the following step (a) and step (b). The present laminating-printing method may further include the following step (c).

Step (a): A step of printing a printed layer and sequentially laminating the printed layers.

Step (b): A step of adjusting the concentration of the gas component in the shield gas Step (c): A step of purging oxygen in the chamber by filling the chamber with a shield gas In the present laminating-printing method, the order in which the step (a) and the step (b) are performed is not particularly limited. Further, the step (a) and the step (b) may be performed in parallel at the same time.

For example, in the production of a laminated-printed object, if the composition of the gas component in the shield gas in the chamber 3 has already been sufficiently optimized to improve the quality of the laminated-printed object, it is possible to start from the step (a). In this case, the composition of the gas component in the shield gas in the chamber 3 may change during the step (a), and the concentrations of the first gas component and the second gas component may fluctuate from the target values. After that, when there is a risk that the quality of the laminated-printed object cannot be improved due to a change in the composition of the gas component, while performing the step (a) or the step (a) is stopped once, the step (b) is started.

On the other hand, in the production of the laminated-printed object, if the composition of the gas component in the shield gas in the chamber 3 is not sufficiently optimized to improve the quality of the laminated-printed object, the process starts from the step (b). In this case, the composition of the gas component in the shield gas in the chamber 3 may change during the step (b), and the concentrations of the first gas component and the second gas component may fluctuate from the target value. When it is expected that the quality of the laminated-printed object can be improved by optimizing the composition of the gas component, while performing the step (b) or the step (b) is stopped once, the step (a) is started.

For example, when the powder material M is irradiated with the laser L during the step (a), a very small amount of water (liquid state) adhering to the surface of the powder material evaporates to become water vapor in the chamber 3, and the water concentration may increase. When using powders of metallic materials, the presence of moisture causes a decrease in the mechanical strength of the laminated-printed object. Therefore, by using the second purification tower 32 and the fourth purification tower 34 as needed, the water concentration in the chamber 3 is reduced. However, if the presence of water in the chamber 3 is preferable for improving the quality of the metal printed object X in relation to the type of the powder material M, it is not necessary to reduce the water concentration in the chamber 3.

(Step (c))

In an example of the present laminating-printing method, first, the step (c) is carried out, and then the step (b) is carried out. For example, the inside of the chamber 3 may be opened to the atmosphere when the unused powder material M is supplied to the storage chamber 4 or when the laminated-printed object is collected. At this time, since the oxygen concentration in the chamber 3 rises, the step (c) is carried out. However, if the oxygen concentration in the chamber 3 is already sufficiently low, the step (c) can be omitted.

In the step (c), oxygen in the chamber 3 is purged (discharged) from the chamber 3 by filling the chamber 3 with the shield gas before the irradiation of the laser L. As a result, the gas in the chamber 3 can be replaced with the shield gas, and the oxygen concentration in the chamber 3 can be reduced. Therefore, when the step (a) is performed, the layer is printed and the printed layer is laminated in an atmosphere in which the oxygen concentration is sufficiently reduced, the mechanical strength of the laminated-printed object is improved, and the quality is improved.

In the step (c), for example, the solenoid valves V1 and V2 shown in FIG. 1 are in the closed state, the shield gas is supplied from the shield gas supply line L4 into the chamber 3, and the purge line (not shown) is opened. As a result, the gas in the chamber 3 can be replaced with the shield gas, and the oxygen concentration in the chamber 3 can be reduced.

In the present laminating-printing method, the step (c) and the step (b) may be performed in parallel at the same time. For example, the solenoid valves V1, V2, and V3 shown in FIG. 1 are in the open state, the solenoid valves V4 and V5 shown in FIG. 3 are in the open state, the shield gas is supplied into the chamber 3 from the shield gas supply line L4, and the purge line (not shown) is opened. As a result, oxygen can be removed by the first purification tower 31 while replacing the gas in the chamber 3 with the shield gas, so that the oxygen concentration in the chamber 3 can be reduced in a short time. The step (c) and the step (b) may be carried out in parallel at the same time while removing the first gas component other than oxygen in the same manner.

(Step (a))

As shown in FIG. 2, in the step (a), the powder material M in the chamber 3 is irradiated with the laser L as an energy ray, the layer is printed in the chamber 3, and the printed layers are sequentially laminated. The step (a) may start when the composition of the gas component in the shield gas in chamber 3 is sufficiently optimized to enhance the quality of the laminated-printed object based on the powder material M.

In the step (a), for example, the laminating-printing unit 10 is used to repeat printing and laminating of the printed layer on the printing stage 9 in the chamber 3. For example, a state in which the powder material M on the upper side of the printing stage 9 is irradiated with the laser L and one printed layer is printed will be described as an example.

After one layer is printed, the printing stage 9 usually moves downward. Next, new powder material M is supplied and spread on the upper side of one printed layer by the recoater 7 from the storage stage 8. In this state, if printing of a new printed layer by irradiation with the laser L is further performed, a new printed layer is provided on the upper side of one printed layer that has already been printed. After that, the printing stage 9 moves further downward, and another new powder material M is further supplied from the storage stage 8. Then, when the laser L is further irradiated, another new printed layer is further provided on the upper side of the layer which has already been laminated on the printed layer.

In this way, in the step (a), printing of the printed layer and laminating of the printed layer are sequentially performed on the printing stage 9.

In the step (a), in the laminating-printing unit 10, when the irradiation of the laser L based on the data input in advance is completed and the laminated-printed object X is completed, the laminated-printed object X is collected. After the collection of the laminated-printed object X, the printing stage 9 rises to the same height as the bottom surface B of the chamber 3, and the powder material after printing the printed layer is transferred to the recovery chamber 6 by the recoater 7. The used powder material recovered in the recovery chamber 6 may be reused after being subjected to a treatment such as reduction.

(Step (b))

In the step (b), the first gas component which is an impurity in the shield gas in the chamber 3 is removed based on the powder material M, and the second gas component selected based on the powder material M is supplied into the chamber 3 based on the powder material M.

The step (b) may be started when the composition of the gas component in the shield gas in chamber 3 is not optimized to improve the quality of the laminated-printed object.

In the step (b) according to the present laminating-printing method, at least one gas component selected from the group consisting of oxygen, water and nitrogen can be removed from the shield gas in the chamber 3 as the first gas component. For example, the first gas component can be removed from the shield gas in the chamber 3 by using at least one selected from the group consisting of the first purification tower 31, the second purification tower 32, the third purification tower 33, and the fourth purification tower 34 shown in FIG. 3.

In the step (b) of the present laminating-printing method, the CPU 37 determines the gas type of the first gas component in the purification section based on information (external signal) such as the material of the powder material M. In the step (b), for example, the gas component may be determined based on the oxygen concentration and the water concentration in the chamber 3 transmitted from the first densitometer C1 and the second densitometer C2 by considering the material of the powder material M.

Examples of the first gas component include the following (X1) to (X7).

(X1): Only one type of oxygen gas component
(X2): Only one type of water component
(X3): Only one type of nitrogen gas component
(X4): Combination of two types of gas components, oxygen and water
(X5): Combination of two types of gas components, water and nitrogen
(X6): Combination of two types of gas components, nitrogen and oxygen
(X7): Combination of three types of gas components: oxygen, water, and nitrogen However, these combinations (X1) to (X7) are assumed based on the purification tower of the concentration adjusting unit 30, and the first gas component in the present invention is not limited to these combinations. In another embodiment of the present invention, the first gas component can be appropriately changed by changing the number of purification towers and the adsorbent in each purification tower. In addition to these exemplified gas components, other gas components may be removed as the first gas component.

In the step (b) of the present laminating-printing method, the first gas component can be changed based on the type of the powder material M.

For example, when the first gas component is (X1) above, the first purification tower 31 is used in the concentration adjusting unit 30 shown in FIG. 3. Specifically, the solenoid valves V4, V5, V9, V12, and V15 are in the open state, and the solenoid valves V6, V7, V8, V10, V11, V13, and V14 are in the closed state. As a result, oxygen can be removed from the shield gas in the chamber 3 as the first gas component by the first purification tower 31.

Similarly, when the first gas component is (X2) above, the second purification tower 32 is used in the concentration adjusting unit 30 shown in FIG. 3. Specifically, the solenoid valves V6, V7, V8, V12, and V15 are in the open state, and the solenoid valves V4, V5, V9, V10, V11, V13, and V14 are in the closed state. As a result, water can be removed from the shield gas in the chamber 3 as the first gas component by the second purification tower 32.

When the first gas component is (X3) above, the third purification tower 33 is used in the concentration adjusting unit 30 shown in FIG. 3. Specifically, the solenoid valves V6, V9, V10, V11, and V15 are in the open state, and the solenoid valves V4, V5, V7, V8, V12, V13, and V14 are in the closed state. As a result, nitrogen can be removed from the shield gas in the chamber 3 as the first gas component by the third purification tower 33.

When the first gas component is (X4) above, the first purification tower 31 and the second purification tower 32 are used in combination in the concentration adjusting unit 30 shown in FIG. 3. Specifically, the solenoid valves V4, V5, V7, V8, V12, and V15 are in the open state, and the solenoid valves V6, V9, V10, V11, V13, and V14 are in the closed state. As a result, each oxygen and water can be removed from the shield gas in the chamber 3 as the first gas component by the first purification tower 31 and the second purification tower 32.

When the first gas component is (X5) above, the second purification tower 32 and the third purification tower 33 are used in combination in the concentration adjusting unit 30 shown in FIG. 3. Specifically, the solenoid valves V6, V7, V8, V10, V11, and V15 are in the open state, and the solenoid valves V4, V5, V9, V12, V13, and V14 are in the closed state. As a result, each of water and nitrogen can be removed from the shield gas in the chamber 3 as the first gas component by the second purification tower 32 and the third purification tower 33.

When the first gas component is (X6) above, the first purification tower 31 and the third purification tower 33 are used in combination in the concentration adjusting unit 30 shown in FIG. 3. Specifically, the solenoid valves V4, V5, V9, V10, V11, and V15 are in the open state, and the solenoid valves V6, V7, V8, V12, V13, and V14 are in the closed state. As a result, each of nitrogen and oxygen can be removed from the shield gas in the chamber 3 as the first gas component by the first purification tower 31 and the third purification tower 33.

When the first gas component is (X7) above, the first purification tower 31, the second purification tower 32, and the third purification tower 33 are used in combination in the concentration adjusting unit 30 shown in FIG. 3. Specifically, the solenoid valves V4, V5, V7, V8, V10, V11, and V15 are in the open state, and the solenoid valves V6, V9, V12, V13, and V14 are in the closed state. Further, when the first gas component is (X7) above, the first purification tower 31, the second purification tower 32, the third purification tower 33, and the fourth purification tower 34 can be used in combination in the concentration adjusting unit 30 shown in FIG. 3. Specifically, the solenoid valves V4, V5, V7, V8, V10, V11, V13, and V14 are in the open state, and the solenoid valves V6, V9, V12, and V15 are in the closed state. As a result, oxygen, water, and nitrogen can be removed from the shield gas in the chamber 3 as the first gas component by the first purification tower 31, the second purification tower 32, the third purification tower 33, and the fourth purification tower 34.

In the step (b) of the present laminating-printing method, one or more gas components selected from the group consisting of hydrogen, oxygen, carbon monoxide, carbon dioxide, and ammonia can be supplied into the chamber 3.

In the step (b) of the present laminating-printing method, the CPU 37 determines whether or not to supply the second gas component and the gas type of the second gas component based on information (external signal) such as the material of the powder material M. In the step (b), for example, when the material of the powder material M is taken into consideration and it can be expected that the quality of the laminated-printed object X can be improved by supplying the second gas component, it is decided to supply the second gas component to the second supply line L2, and determine the gas type of the second gas component based on the powder material M.

It is possible to determine whether or not to supply the second gas component and the gas type of the second gas component based on the material of the powder material M. Further, it is also possible to determine based on the gas type of the first gas component determined based on the powder material M, the oxygen concentration and the water concentration in the chamber 3 measured by the first densitometer C1 and the second densitometer C2, in addition to the information regarding the powder material M.

For example, when the powder material M is an aluminum alloy, since the pores in the cross section of the metal printed object are reduced, and the quality of the metal printed object can be further improved, it is preferable to supply oxygen into the chamber 3 as the second gas component. When the powder material M is an aluminum alloy, the CPU 37 determines to supply the second gas component, and the solenoid valve V16 is in the open state. In addition, the CPU 37 determines the gas type of the second gas component to be oxygen, and the oxygen supply source is selected as the supply source 36.

When oxygen is supplied into the chamber 3 as the second gas component as in the case in which the powder material M is an aluminum alloy, it is preferable to use the fourth purification tower 34. For example, when the oxygen concentration in the chamber 3 transmitted from the first densitometer C1 is lower than the target concentration for optimization, the first purification tower 31 may not be used, and the second purification tower 32, the third purification tower 33, and the fourth purification tower 34 may be used. In this case, the valves V6, V7, V8, V10, V11, V13, and V14 are in the open state, and the valves V4, V5, V9, V12, and V15 are in the closed state. It is also possible to use the third purification tower 33 and the fourth purification tower 34 without using the first purification tower 31 and the second purification tower 32. In this case, the valves V6, V9, V12, V13, and V14 are in the open state, and the valves V4, V5, V7, V8, V10, V11, and V15 are in the closed state. Furthermore, the first purification tower 31, the second purification tower 32, and the third purification tower 33 may not be used, and only the fourth purification tower 34 may be used. In this case, the valves V6, V9, V12, V13, and V14 are in the open state, and the valves V4, V5, V7, V8, V10, V11, and V15 are in the closed state. As a result, only the water concentration of the shield gas in the chamber 3 decreases, the required amount of oxygen can be supplied from the supply source 36 to the second supply line L2 via the third supply line L12, the oxygen in the chamber 3 can be supplied, and the oxygen concentration in the chamber 3 can be kept constant.

Even if the shield gas is obtained through such a supply line, and the oxygen concentration is lower than the target concentration, it is also possible to open V16 and add oxygen gas to the shield gas from the second gas component supply source 36 via the third supply line L12.

As described above, in the step (b) of the present laminating-printing method, the second gas component can be supplied to the gas from which the first gas component has been removed in the purification section of the concentration adjusting unit 30 as needed. Therefore, the concentration of the second gas component in the chamber 3 can be kept constant, and the quality of the laminated-printed object can be further improved based on the powder material M.

For example, when oxygen is supplied into the chamber 3 as the second gas component as in the case in which the powder material M is an aluminum alloy, in the step (c), the first purification tower 31 and the second purification tower 32 are used to remove both oxygen and water in the chamber 3. Next, it is assumed that the step (a) and the step (b) are performed at the same time. In this case, since it is assumed that the water concentration in the chamber 3 increases in the step (a), the water is removed from the shield gas by the second purification tower 32 by carrying out the step (b).

Further, when the powder material M is an aluminum alloy, since the pores in the cross section of the metal printed object are reduced, and the quality of the metal printed object can be further improved, oxygen is supplied from the supply source 36 into the chamber 3 in the step (b).

When the powder material M is a stainless steel alloy or a nickel alloy, since the mechanical properties of the laminated-printed object X are excellent, it is preferable that while oxygen and water be removed from the chamber 3 by the first purification tower 31 and the second purification tower 32 in the step (c), the combination of two gas components, oxygen and water be removed as the first gas component in the step (b).

Further, when the powder material M is a titanium alloy, since the pores of the laminated-printed object X are reduced and the mechanical properties are excellent, it is preferable that while three gas components of oxygen, water, and nitrogen be removed by the first purification tower 31, the second purification tower 32, and the third purification tower 33, these three gas components be purged from the chamber 3 in the step (c), and these three gas components be removed as the first gas component in the step (b).

As described above, according to the laminating-printing system 70 or the laminating-printing method of the present embodiment, the quality of the metal printed object can be further improved by selecting the first gas component and/or the second gas component in the step (b) based on the powder material M.

In the step (b) of the present laminating-printing method, solid impurities such as fumes and sputter in the shield gas may be removed by the filter 51 in the filter unit 50 shown in FIG. 1. In particular, in the step (a), solid impurities such as fumes and sputter may be generated during printing and laminating of the printed layer. Therefore, the quality of the laminated-printed object X can be further improved by removing these solid impurities such as fumes and sputter.

(Action Effect)

The laminating-printing method described above includes the step (b). In the step (b), the first gas component, which is an impurity in the shield gas, is removed depending on the powder material. Therefore, the gas component which is an impurity in the shield gas depending on the material of the powder material can be removed by selecting whether to use the first purification tower, the second purification tower, the third purification tower, and the fourth purification tower. Therefore, the concentration of the gas component in the shield gas in the chamber, which is unnecessary for the production of the metal printed object, and the gas component which causes the deterioration of the mechanical properties of the metal printed object, can be reduced based on the powder material. The quality of the printed object can be further enhanced depending on the powder material.

In addition, in the step (b) of the present laminating-printing method, the second gas component selected based on the powder material is supplied into the chamber as needed. Therefore, the gas component expected to contribute to the quality improvement of the laminated-printed object X based on the material of the powder material can be supplied into the chamber and its concentration can be kept constant. As a result, the concentration of the second gas component in the shield gas in the chamber is optimized based on the powder material, and the quality of the metal printed object can be further improved based on the powder material.

According to the present laminating-printing method, a part of the shield gas in the chamber 3 can be taken out, the concentration of the shield gas can be adjusted by the concentration adjusting unit, and solid impurities such as fumes and sputter can be removed. As a result, the concentration of the gas components in the shield gas in the chamber 3 can be set to the concentration (target value) optimized for improving the quality of the metal printed object in an extremely short time. If necessary, the concentration of the second gas component in the chamber 3 can be adjusted to a target value, and the target value can be stably maintained.

For example, in the present laminating-printing method, the oxygen concentration and the water concentration in the shield gas in the chamber 3 can be extremely lowered in a short time by removing oxygen and water from the shield gas in the chamber as the first gas component. Then, if necessary, the oxygen concentration can be optimized and the optimized component composition can be maintained by supplying oxygen as the second gas component from the supply source 36 into the chamber 3 via the third supply line L12 and the second supply line L2.

According to the present laminating-printing method, when the chamber 3 is filled with the shield gas, a part of the shield gas is taken out by the first supply line, oxygen is removed by the purification section of the concentration adjusting unit, and then oxygen can be purged from the chamber 3 while being resupplied with the gas from which oxygen has been removed into the chamber 3 by the supply line L2. As a result, the oxygen concentration can be reduced in an extremely short time and the consumption of the shield gas can be reduced as compared with the case in which the oxygen in the chamber is purged only by supplying the shield gas. Therefore, it is possible to produce a laminated-printed object with further improved quality in a short time and efficiently as compared with the conventional laminating-printing method.

In the step (c) of the present laminating-printing method, a part of the shield gas in the chamber 3 can be taken out by the first supply line L1, and oxygen can be removed from the shield gas by the first purification tower 31. Then, the shield gas from which oxygen has been removed can be resupplied into chamber 3 via the second supply line L2. In this way, since a part of the shield gas in the chamber 3 can be circulated between the chamber 3 and the first purification tower 31, the oxygen concentration in the shield gas in the chamber 3 can be reduced in a short time.

In addition, while a part of the shield gas in the chamber 3 is circulated between the chamber 3 and the first purification tower 31, it is not necessary to supply new shield gas into the chamber 3 by the shield gas supply line L4. Therefore, according to the present embodiment, it is possible to reduce the oxygen concentration to a low level which could not be achieved unless a large amount of the shield gas is conventionally supplied into the chamber 3 with a relatively small amount of the shield gas supplied. Further, since the supply amount of the shield gas is significantly reduced, the oxygen concentration in the chamber 3 can be reduced in an extremely short time.

Although some embodiments of the present invention have been described above, the present invention is not limited to such specific embodiments. In addition, in the present invention, various additions, omissions, replacements, or other modifications may be made within the scope of the gist of the present invention described in the claims.

For example, in the embodiment above, the number of purification towers is four, but the present invention is not limited to the form in which the number of purification towers is four. The number of the purification towers can be changed based on the number of first gas components to be removed.

Further, in the embodiment above, the purification section removes at least one gas component selected from the group consisting of oxygen, water, and nitrogen. However, examples of the first gas component to be removed may further include other gas components in addition to oxygen, water, and nitrogen. Therefore, in another embodiment, the type of adsorbents in the purification towers and the number of purification towers can be changed based on the powder material M.

Further, in the embodiment above, the control section of the concentration adjusting unit is provided separately from the purification section and the supply section of the concentration adjusting unit. However, the control section may be included in the purification section and the supply section.

Further, in the embodiment above, the control section forms a part of the concentration adjusting unit. However, the control section may be a part of the laminating-printing section, and may be provided separately from the laminating-printing unit and the concentration adjusting unit in another embodiment.

EXAMPLES

Hereinafter, the present invention will be specifically described with reference to Examples. However, the present invention is not limited by the following description.

Example 1

Using the laminating-printing system 70 shown in FIG. 1, the step (c) was performed for 2 hours. Specifically, the gas in the chamber 3 was replaced with the shield gas by opening the solenoid valves V3, closing the solenoid valves V1 and V2, and opening the purge line (not shown). After 2 hours had passed since the start of the step (c), the valves V1 and V2 were in the open state, the solenoid valve V3 was in the closed state, the step (c) was completed, and the supply of the shield gas by the purge line (not shown) was stopped. Then, the step (b) was started. In the step (b), the solenoid valves V4, V5, V9, V12, and V15 shown in FIG. 3 were in the open state, and the solenoid valves V6, V7, V8, V10, V11, V13, and V14 were in the closed state. As a result, oxygen was removed from the shield gas in the chamber 3 as the first gas component by the first purification tower 31. Then, in order to verify the effect of carrying out the step (b), the time course of the measured value of the oxygen concentration in the chamber 3 was observed.

Comparative Example 1

The time course of the measured value of the oxygen concentration in the chamber 3 was observed in the same manner as in Example 1 except that after 2 hours had passed since the start of step (c), the step (c) was not completed and the purge line (not shown) was continuously opened.

Example 2

The step (c) was completed, the supply of the shield gas by the purge line (not shown) was stopped, and the step (b) was started, and then in order to verify the effect of carrying out the step (b), the time course of the measured value of the water concentration in the chamber 3 was observed in the same manner as in Example 1, except that after 2 hours had passed since the start of step (c), the solenoid valves V6, V7, V8, V12, and V15 were in the open state, and the solenoid valves V4, V5, V9, V10, V11, V13, and V14 were in the closed state, and water was removed by the second purification tower 32. Then, in order to verify the effect of carrying out the step (b), the time course of the measured value of the water concentration in the chamber 3 was observed.

Comparative Example 2

The time course of the measured value of the water concentration in the chamber 3 was observed in the same manner as in Example 2 except that after 2 hours had passed since the start of step (c), the step (c) was not completed and the purge line (not shown) was continuously opened.

Example 3

Titanium alloy was used as the powder material in the laminating-printing system 70. In Example 3, it was determined by the CPU 37 that the combination of the three gas components (X7): oxygen, water, and nitrogen was removed as the first gas component in the step (b). Further, it was determined by the CPU 37 that the supply source 36 does not supply the second gas component.

First, the solenoid valves V3 was in the open state, the solenoid valves V1 and V2 were in the closed state, and the purge line (not shown) was opened to replace the gas in the chamber 3 with the shield gas, and step (c) was performed for 2 hours. After 2 hours had passed since the start of step (c), the solenoid valves V4, V5, V7, V8, V10, V11, and V15 were in the open state, and the solenoid valves V6, V9, V12, V13, V14, and V16 were in the closed state. Thereby, the supply of shield gas by the purge line (not shown) was stopped. After that, while performing the step (b) in which oxygen, water, and nitrogen were removed as the first gas component from the shield gas in the chamber 3 by the first purification tower 31, the second purification tower 32, and the third purification tower 33, the step (a) was carried out to produce a laminated-printed object made of stainless steel alloy.

Comparative Example 3

A laminated-printed object made of a stainless-steel alloy was produced in the same manner as in Example 3 except that after 2 hours had passed since the start of the step (c), the step (a) was performed without performing the step (b).

Example 4

Aluminum alloy was used as the powder material in the laminating-printing system 70. In Example 4, it was determined by the CPU 37 that X (2): one type of gas component of water was removed in step (b) as the first gas component.

Further, it was also determined by the CPU 37 that oxygen was supplied from the supply source 36.

First, the solenoid valves V3 were in the open state, the solenoid valves V1 and V2 were in the closed state, and the purge line (not shown) was opened to replace the gas in the chamber 3 with the shield gas, and step (c) was performed for 2 hours. After 2 hours had passed since the start of step (c), the solenoid valves V6, V7, V8, V12, V13, V14, and V16 were in the open state, and the solenoid valves V4, V5, V9, V10, V11, and V15 were in the closed state. The supply of shield gas through the purge line (not shown) was stopped. After that, only water was removed from the shield gas in the chamber 3 as the first gas component by the second purification tower 32 and the fourth purification tower 34, and while performing the step (b) in which oxygen was supplied into the chamber 3 as the second gas component from the supply source 36, the step (a) was carried out to produce a laminated-printed object made of a stainless steel alloy.

Comparative Example 4

A laminated-printed object made of a stainless-steel alloy was produced in the same manner as in Example 4 except that after 2 hours had passed since the start of step (c), the step (a) was performed without performing the step (b).

Figure 4:
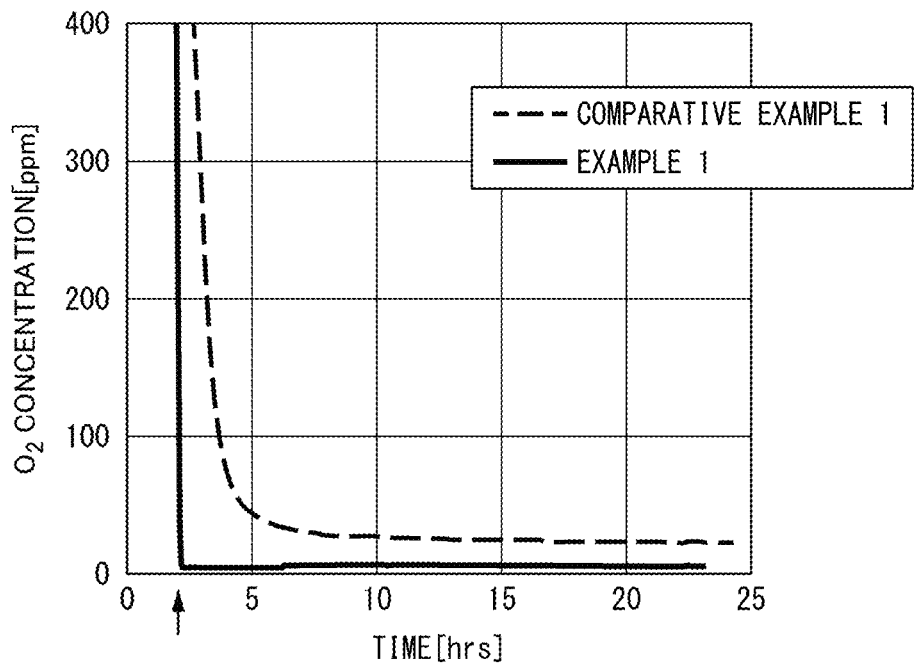
FIG. 4 is a graph which compares time passage of an oxygen concentration in a chamber in Example 1 and time passage of an oxygen concentration in a chamber in Comparative Example 1.

FIG. 4 is a graph which compares the time passage of oxygen concentration in the chamber in Example 1 and the time passage of an oxygen concentration in the chamber in Comparative Example 1. As shown in FIG. 4, after 2 hours had passed since the start of the step (c), in Example 1 in which the step (b) was started, the oxygen concentration in the chamber 3 was suddenly reduced as compared with Comparative Example 1. From this result, it was confirmed that according to the laminating-printing system 70, the oxygen concentration in the chamber 3 could be reduced to a low level (about 1 ppm) in an extremely short time. As described above, in Example 1, the oxygen concentration in the chamber 3 could be reduced to a low level, even if the amount of the shield gas used for purging was relatively small. Therefore, it is considered that a laminated-printed object with excellent mechanical properties and good quality can be produced efficiently in a short time and at low cost with less mixing of the oxygen atoms.

Figure 5:
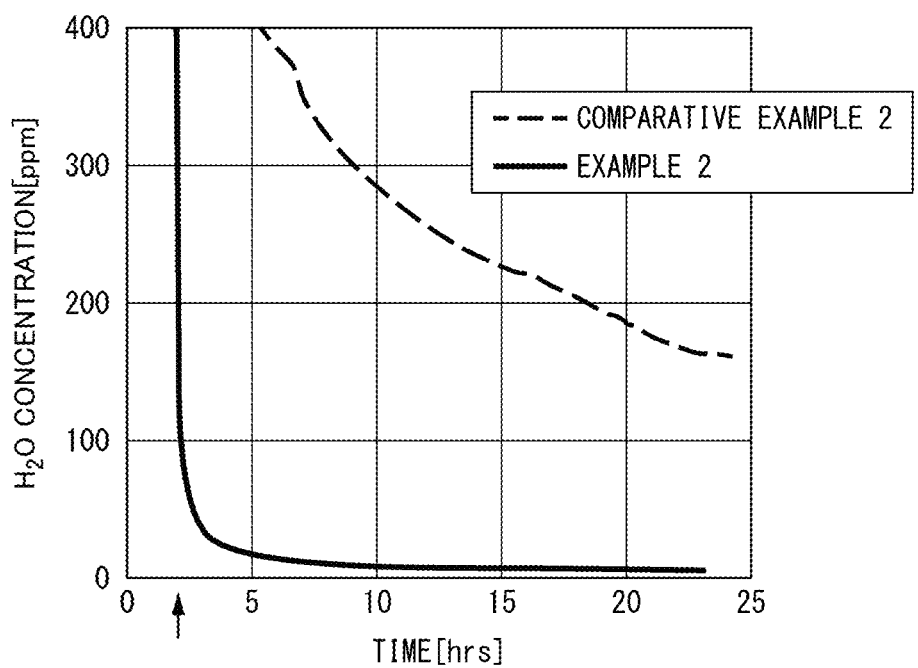
FIG. 5 is a graph which compares time passage of water concentration in a chamber in Example 2 and time passage of water concentration in a chamber in Comparative Example 2.

FIG. 5 is a graph which compares the time passage of water concentration in the chamber in Example 2 and the time passage of water concentration in the chamber in Comparative Example 2.

As shown in FIG. 5, after 2 hours had passed since the start of the step (c), in Example 2 in which the step (b) was started, the water concentration in the chamber was suddenly reduced as compared with Comparative Example 2. From this result, it was confirmed that according to the laminating-printing system 70, the water concentration in the chamber could be reduced to a low level (about 5 ppm) in an extremely short time. As described above, in Example 2, the water concentration in the chamber could be reduced to a low level, even if the amount of the shield gas used for purging was relatively small. Therefore, it is considered that a laminated-printed object with excellent mechanical properties and good quality can be produced efficiently in a short time and at low cost with less mixing of the hydrogen atoms.

Figure 6:
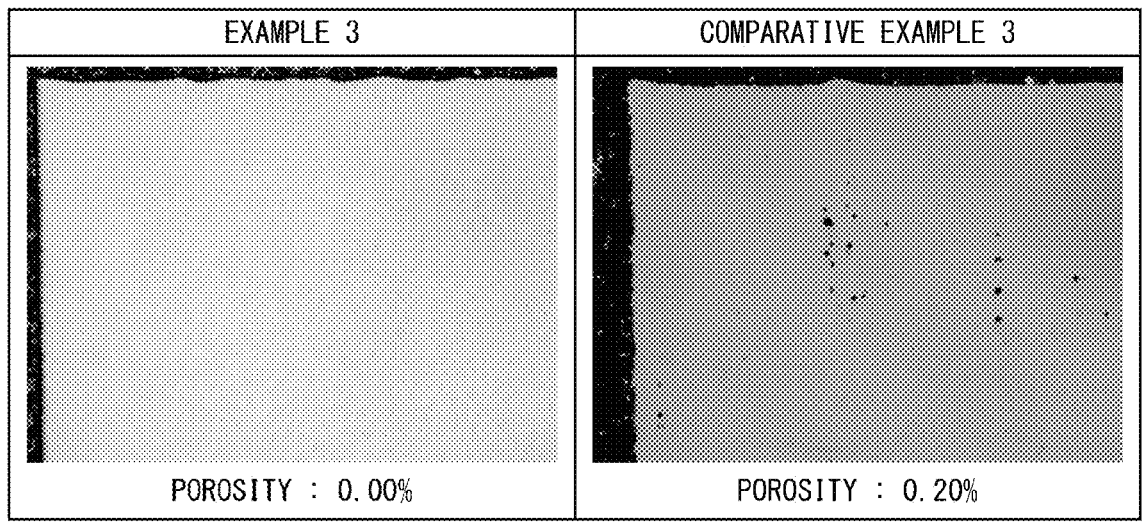
FIG. 6 is a diagram which compares an enlarged photograph of a cross section of a metal printed object of Example 3 and an enlarged photograph of a cross section of a metal printed object of Comparative Example 3.

FIG. 6 is a diagram which compares an enlarged photograph of a cross section of the metal printed object of Example 3 and an enlarged photograph of a cross section of the metal printed object of Comparative Example 3. The porosity of the laminated-printed object of Example 3 was 0.00%, whereas the porosity of the laminated-printed object of Comparative Example 3 was 0.20%. As described above, the pores of the laminated-printed object could be reduced and the quality could be further improved by adjusting the composition of the gas component in the chamber based on the material of the powder material M.

Figure 7:
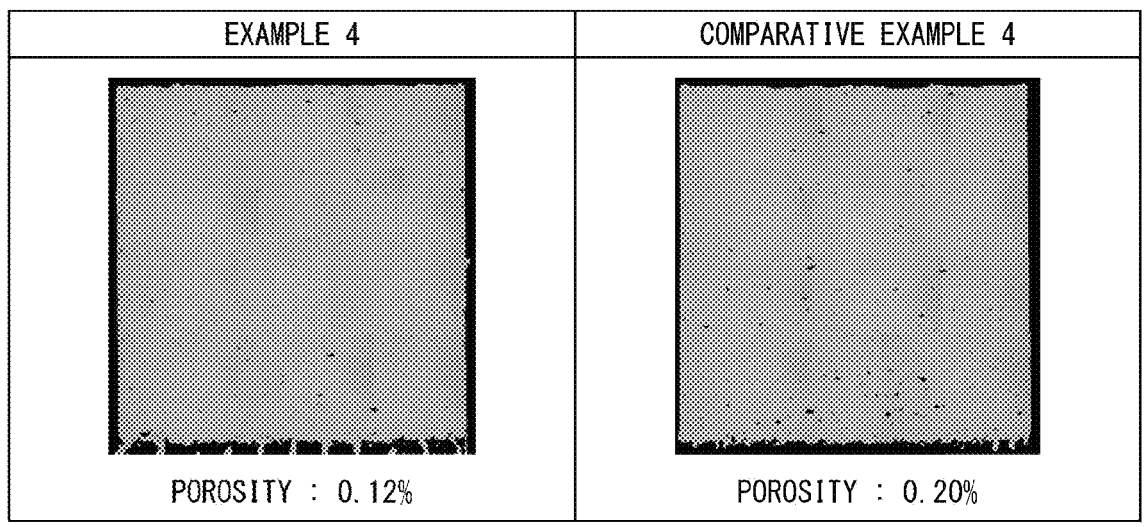
FIG. 7 is a diagram which compares an enlarged photograph of a cross section of a metal printed object of Example 4 and an enlarged photograph of a cross section of a metal printed object of Comparative Example 4.

FIG. 7 is a diagram which compares an enlarged photograph of a cross section of the metal printed object of Example 4 and an enlarged photograph of a cross section of the metal printed object of Comparative Example 4. The porosity of the laminated-printed object of Example 4 was 0.12%, whereas the porosity of the laminated-printed object of Comparative Example 4 was 0.20%. As described above, the pores of the laminated-printed object could be reduced and the quality could be further improved by adjusting the composition of the gas component in the chamber based on the material of the powder material M.

EXPLANATION OF REFERENCE NUMERALS 1 laser oscillator
2 optical system
3 chamber
4 storage room
5 printing room
6 recovery chamber
7 recoater
8 storage stage
9 printing stage
10 laminating-printing unit
30 concentration adjusting unit
31 first purification tower
32 second purification tower
33 third purification tower
34 fourth purification tower
35 blower
36 second gas component supply source
37 CPU
50 filter unit
51 filter
52 ventilator
70 laminating-printing system
C1 first densitometer
C2 second densitometer
L1 first supply line
L2 second supply line
L3 circulation line
L5 first connection line
L6 second connection line
L7 third connection line
L8 first bypass line
L9 second bypass line
L10 third bypass line
L11 fourth bypass line
L12 third supply line
V1 to V3, and V4 to V16 electromagnetic valve

The invention claimed is:

1. A laminating-printing system in which heat is supplied to a powder material using energy rays in the presence of a shield gas to print layers, and the layers are sequentially laminated to produce a laminated-printed object,
wherein the laminating-printing system comprises:
a laminating-printing unit which prints the layers and sequentially laminates the layers; and
a concentration adjusting unit which adjusts the concentration of gas components in the shield gas; and
a shield gas supply line which supplies the shield gas into the chamber, and
the laminating-printing unit comprises:
an irradiation section including an irradiation source of energy rays to irradiate the powder material, and
a printing section including a chamber filled with the shield gas and a printing stage on which the layers are printed and laminated, and
the concentration adjusting unit comprises:
a purification section which removes a first gas component which is an impurity in the shield gas based on the powder material; and
a supply section which supplies a second gas component selected based on the powder material inside of the chamber as needed,
wherein the laminating-printing system further comprises a first supply line which supplies a part of the shield gas in the chamber into the purification section, and
the purification section comprises at least one selected from the group consisting of a first purification tower, a second purification tower, a third purification tower, and a fourth purification tower, which are connected with the first supply line, wherein:
the first purification tower is a purification tower which removes oxygen from the shield gas;
the second purification tower is a purification tower which removes water from the shield gas;
the third purification tower is a purification tower which removes nitrogen from the shield gas;
the fourth purification tower is a purification tower which removes water and does not remove oxygen from the shield gas; and
wherein the purification section further comprises at least one selected from the group consisting of a first bypass line, a second bypass line, a third bypass line, and a fourth bypass line:
wherein the first bypass line is a bypass line in which the shield gas supplied from the first supply line is supplied to the secondary side of the first purification tower without being supplied to the first purification tower;
wherein the second bypass line is a bypass line in which the shield gas supplied from the first supply line is supplied to the secondary side of the second purification tower without being supplied to the second purification tower;
wherein the third bypass line is a bypass line in which the shield gas supplied from the first supply line is supplied to the secondary side of the third purification tower without being supplied to the third purification tower;
wherein the fourth bypass line is a bypass line in which the shield gas supplied from the first supply line is supplied to the secondary side of the fourth purification tower without being supplied to the fourth purification tower.

2. The laminating-printing system according to claim 1, wherein the supply section comprises a source of the second gas component which is at least one selected from the group consisting of hydrogen, oxygen, carbon monoxide, carbon dioxide, and ammonia.

3. The laminating-printing system according to claim 1, wherein the laminating-printing system further comprises:
a second supply line which supplies gas from which the first gas component has been removed from the shield gas by the purification section into the chamber; and a third supply line which supplies the second gas component to the gas in the second supply line as needed.

\* \* \* \* \*